*Jefferson Ehrlich*
ATTORNEY

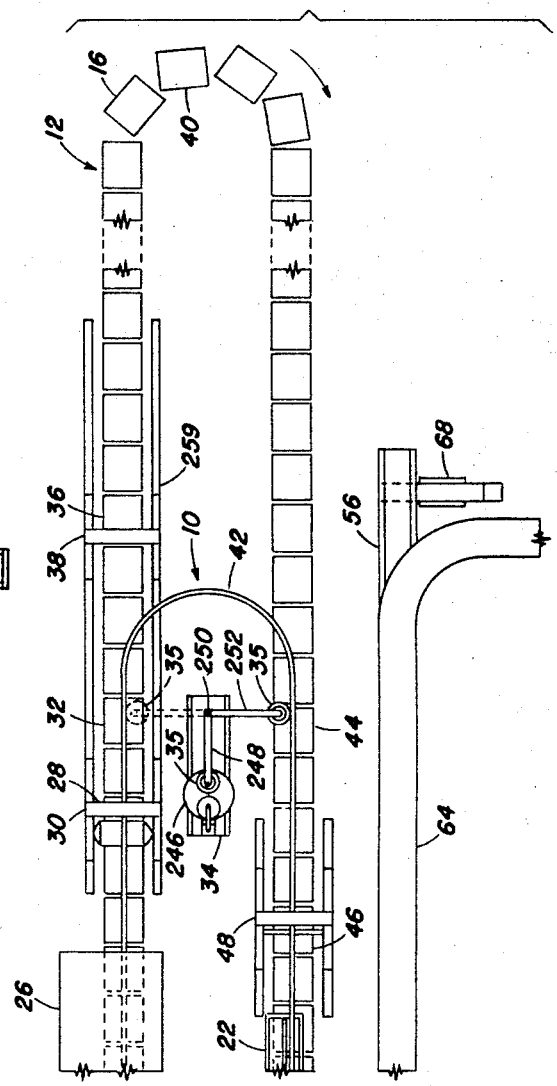
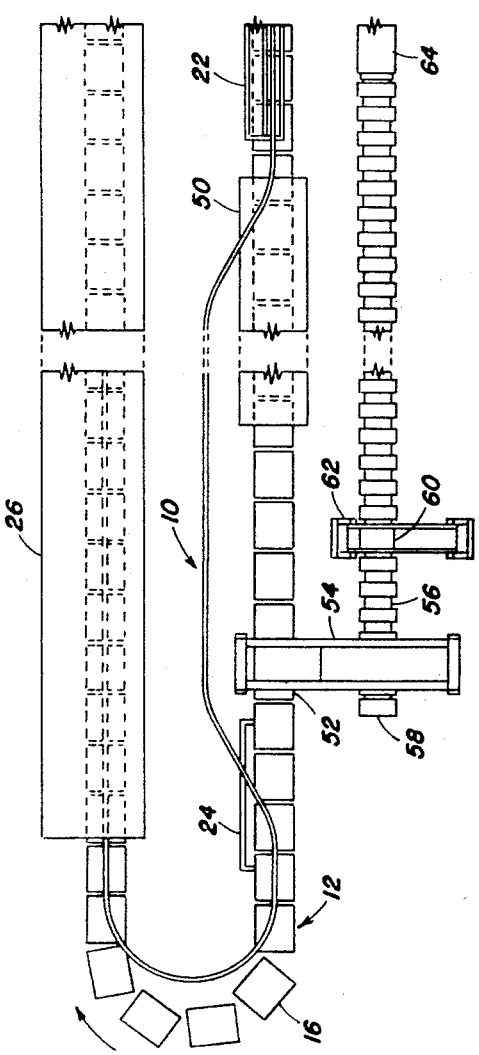
Fig. 1A.
Fig. 1B.
INVENTORS
Alanson J. Arnold
Burton Van Dyke
Don Van Dyke
David D. Porter
BY
Jefferson Ehrlich
ATTORNEY INVENTORS
Alanson J. Arnold
Burton Van Dyke
Don Van Dyke
BY David D. Porter

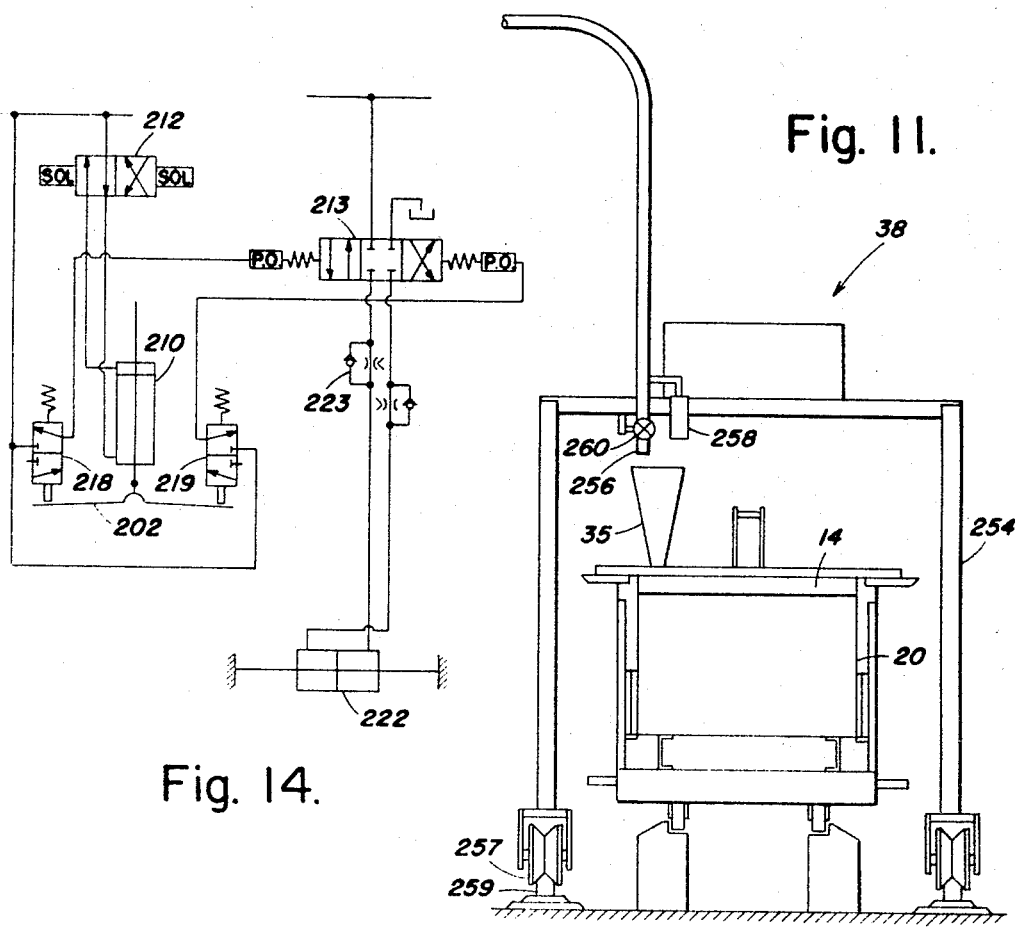
Fig. 11.
Fig. 14.
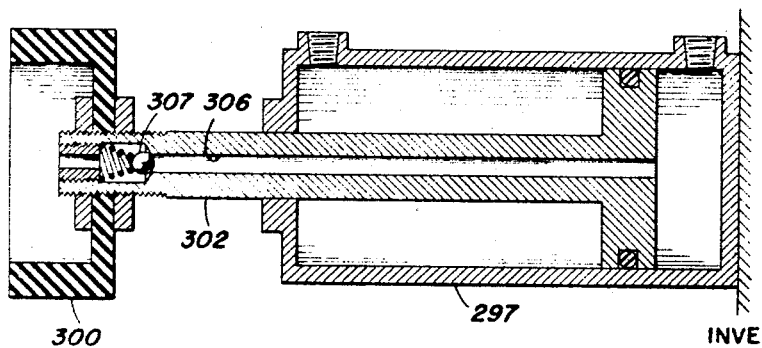
Fig. 19.

Fig. 17.
Fig. 18.
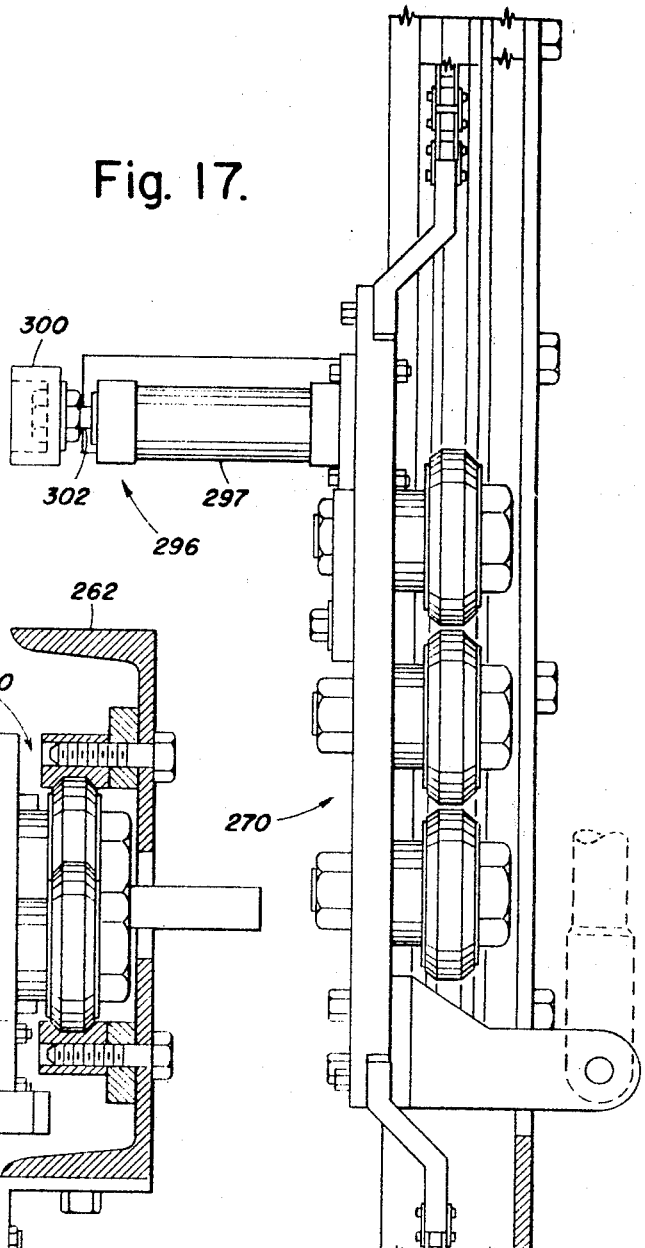
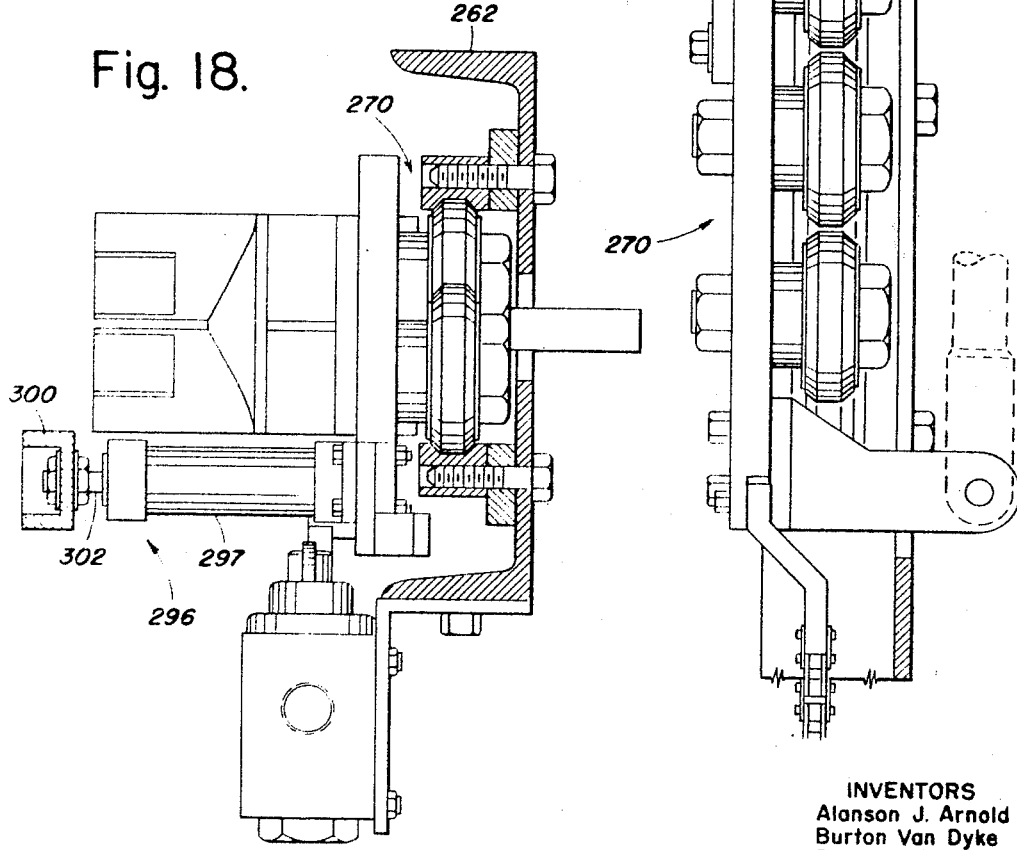
INVENTORS
Alanson J. Arnold
Burton Van Dyke
Don Van Dyke
David D. Porter
BY
ATTORNEY

United States Patent Office 3,448,496
Patented June 10, 1969

3,448,496
APPARATUS FOR CASTING CERAMIC ARTICLES INCLUDING SEPARATE CLOSED LOOP CONVEYORS FOR MOLDS AND CORES
Alanson J. Arnold, New Orleans, La., Burton Van Dyke, Westport, Conn., Don Van Dyke, Louisville, Ky., and David D. Porter, Metuchen, N.J., assignors to American Standard Inc., a corporation of Delaware
Original application Apr. 22, 1964, Ser. No. 361,847, now Patent No. 3,397,259, dated Aug. 13, 1968. Divided and this application Sept. 15, 1967, Ser. No. 679,275
Int. Cl. B28b 15/00, 17/00
U.S. Cl. 25—2
13 Claims

ABSTRACT OF THE DISCLOSURE

This application discloses apparatus for manufacturing cast or ceramic articles. The apparatus includes a closed loop conveyor for conveying a plurality of tub molds and a separate closed loop conveyor, which may be an overhead conveyor, for conveying a plurality of core molds. The arrangement employs a single core setting station, through which the conveyors pass, for mating the core and tub molds. The mated molds are moved to a slip pouring station where the cavity or cavities between the molds are filled. After the slip has solidified, the mated molds pass through a core lifting station which removes each core mold from the tub mold and returns the core mold to its overhead conveyor. Thereafter, the cast tank is removed from the tub mold and undergoes treatment and finishing.

---

This application is a division of application Ser. No. 361,847, filed Apr. 22, 1964, now Patent No. 3,397,259, issued Aug. 13, 1968, entitled, Method for Casting Articles.

This invention relates to apparatus for manufacturing cast articles and more particularly to apparatus for casting articles which utilize mechanized components for conveying and handling molds and other structures used in performing the casting operation.

The present invention is particularly well adapted for manufacturing various types of cast ceramic plumbing fixtures and components and accordingly, apparatus for manufacturing water closet tanks will be illustrated and described. However, it will be understood that the principles of the invention are readily adaptable to manufacturing other articles either out of ceramics or other types of materials. Consequently, the following description as it pertains to the casting of ceramic water closet tanks is not to be considered as a limitation to the specific material, structures, and methods shown but merely as illustrative of the principles of the invention.

Ceramic articles such as water closet tanks are conventionally manufactured by pouring a liquid ceramic slurry, usually referred to as slip, into closed molds made of a porous material such as plaster of Paris. The porous molds absorb water and moisture from the slip thereby causing the slip to solidify within the molds. The molds and the newly formed article are then separated and the molds dried so that they can be used again.

In manufacturing water closet tanks two molds are required; namely, a tub mold and a core mold. The core mold is inserted within the tub mold so that there is a cavity between the two defining the outline of the tank to be formed. The two molds are clamped and slip poured into the cavity and allowed to solidify. The molds are then unclamped, the core removed from the solidified tank and finally the solidified tank removed from the tub mold. One aspect of the invention contemplates the use of a pair of conveyors, one of which carries a plurality of core molds and the other which carries a plurality of tub molds. These conveyors are disposed relative to one another such that means may be provided for removing a core mold from the core conveyor and placing it within a tub mold to thereby mate the molds for casting. Also means are provided for pouring the slip into the molds and subsequently separating the molds from one another and from the cast article.

Accordingly, an object of the present invention is to provide apparatus for continuously making a cast article which dispenses with many of the manual, burdensome, and laborious operations heretofore required and which utilizes systems and procedures which adapt the casting operation to mechanization.

Another object is to provide apparatus for conveying, handling, and manipulating molds as the latter are mated and separated to form a cast article.

Other objects and features of the invention will appear as a description of the particular physical embodiment selected to illustrate the invention progresses.

For a better understanding of the present invention, reference should be had to the accompanying drawings wherein like numerals of reference indicate similar parts throughout the several views and wherein:

FIGS. 1A and 1B are schematic plan views of right-hand and left-hand portions respectively of the mold-carrying conveyors and the operating stations through which the conveyors pass.

FIG. 11 is a schematic view of the slip pouring machine.

FIG. 14 is a schematic view of the controls for aligning the core setting machine.

FIG. 17 is an elevational partial view taken along a plane parallel to the path of travel of the conveyors showing the air release mechanism and the carrier on the core lifting machine.

FIG. 18 is a plan view of FIG. 17.

FIG. 19 is a schematic cross-sectional view of the air release mechanism.

Figure 2:
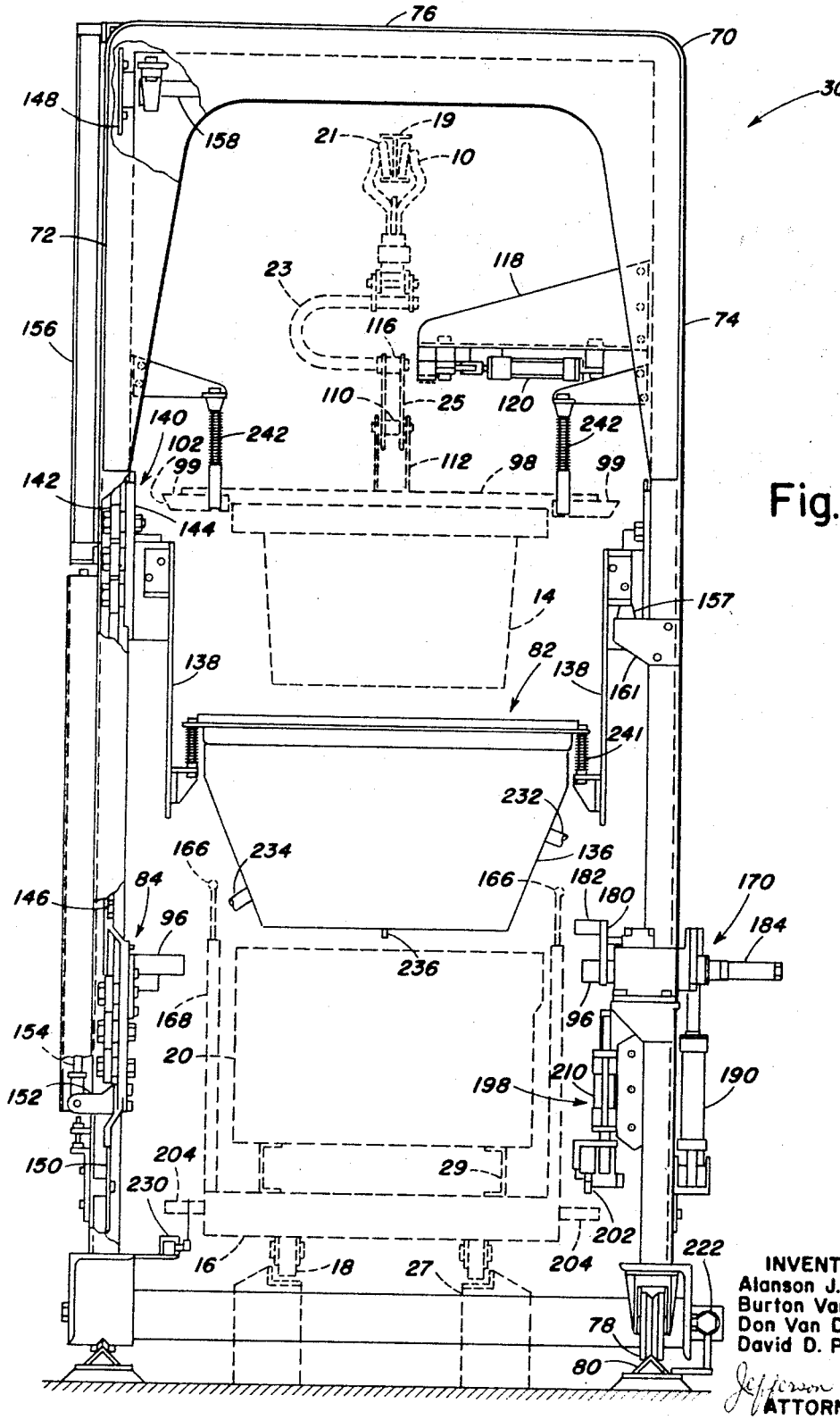
FIG. 2 is an elevational view of the core setting machine.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed is for the purpose of description and not of limitation.

Referring to the drawings, FIGS. 1A and 1B show in plan view an overhead core conveyor 10 and a tub conveyor 12 each formed into an endless loop and each disposed at the same elevation throughout its respective closed loop. These conveyors carry respectively a plurality of substantial equally spaced core molds 14 and tub molds 20. The molds may be seen in FIG. 2, for example.

The tub conveyor 12 comprises a plurality of trucks 16 each mounted on wheels 18 and all of which are coupled together to form an endless train. The trucks 16 may travel on an elevated track 27. Each truck 16 carries a tub mold 20 which may be mounted on spacers 29. Each tub mold 20 is adapted to be mated with a core mold 14 as will be described. The core conveyor 10 comprises an operhead beam 19 supporting rollers 21 which in turn support spaced U-shaped members 23 from which hooks 25 are suspended. These hooks 25 carry the core molds 14.

Drive means 22 and 24 are provided to periodically move or index the conveyors 10 and 12 respectively as they convey the core and tub molds to the various stations around the closed loops. The drive means 22, 24 may be comprised of operating cylinders or other power means operable to engage and advance the respective conveyor to the various stations around the closed loops. Upon each operation of indexing of the drive means 22 and 24 each core 14 and truck 16 will advance an equal predetermined distance so that various operations may be performed progressively on the molds to mate and separate them. The conveyors 10 and 12 are arranged such that in traversing around the loop, a complete casting operation will be performed. After the casting operation is completed and the cast article removed therefrom, the molds are dried and are then ready to perform another casting operation all in a continuous manner as they are indexed in synchronism around the closed loops.

After the cores 14 and tubs 20 pass through and exit from the mold dryer 26 they enter a core setting station 28 where a core setting machine 30 is operable to unhook a core 14 from the overhead core conveyor 10, lower it into the tub 20, and thereafter clamp the two molds together. The truck 16 carrying the mated and clamped molds exits from station 28 and passes to the funnel handling station 32 where a funnel handling machine 34 is operable to place a funnel 35 on the core. Further details of the apparatus and what occurs at each station will be described hereinafter but let it suffice for now to give a brief description of the sequence of station arrangement and the functions of each station.

The truck 16 carrying the mated and clamped molds which now carry a funnel 35 are then indexed to a slip pouring station 36 where a slip pouring machine 38 pours slip into the mold cavity. The slip in the mated molds is then allowed to solidify as the truck 16 traverses the 180° turn 40 to commence its travel on the second leg of the endless train. It will be observed that the core conveyor 10 makes a 180° turn 42 just after the core setting station 28 since there is no need to extend this conveyor after it has relinquished its core to the tub molds 20 at the core setting station 28. The tub conveyor 12 extends to the 180° turn 40 to allow the slip to solidify as the conveyors are indexed at a substantially constant rate.

At the subsequent funnel handling station 44, the funnel handling machine 34 is operable to remove the funnel 35 from the core and wash it as will be further described.

After the funnel 35 has been removed at station 34, the trucks 16 enter the core lifting station 46 where a core lifting machine 48 is operable to unclamp the molds and lift the core mold 14 from the tub mold 20 and return it to the hook on the core conveyor 10. After the truck 16 exits the core lifting station 48, the tub mold 20 carrying the solidified tank casting therein then passes through the tank drier 50. It will be observed that the core conveyor 10 and the cores carried thereon bypass the tank drier 50 as shown in FIG. 1B.

The tub mold 20 and the cast tank carried therein exit the tank drier 50 and then pass to a tank transfer station 52 where a tank transfer machine 54 is operable to lift the cast tank from the tub mold 20, transfer it laterally, and deposit it on a pallet carried on a finishing conveyor 56. Details of the transfer machine 54 are disclosed in A. J. Arnold co-pending application Ser. No. 126,177. As the cast tank is transferred laterally, a pallet feeder 58 places a pallet on the finishing conveyor 56 such that the transfer machine 54 will deposit the cast tank on the pallet. The cast tank is then moved on the finishing conveyor 56 to a hole punching station 60 where a hole punching machine 62 is operable to punch holes in the tank, such as the holes for the flush handle and the hole for the drain outlet. After the holes have been punched, the tank moves along the conveyor 56 whereupon finishing operations may be performed thereon.

If desired, other conveyor systems may be provided to receive the tank from finishing conveyor 56. For example, a roller conveyor 64 may be provided to receive the tanks from the finishing conveyor 56 and transfer them to other finishing stations or directly into a tank drier. The finishing conveyor 56 may be an endless conveyor extending beneath a portion of roller conveyor 64 and having an upper and lower run such that when the pallets are manually removed from underneath the tanks, such pallets may be manually placed in a pallet feeder 68 which feeds the pallets to the lower run of conveyor 56 and returns them to the pallet feeder 58 ready for re-use.

Returning to the description of the main conveyors 10 and 12, after the tanks have been moved from the trucks 16, the conveyors 10 and 12 make a 180° turn and thence pass through the mold drier 26 which is a heated enclosure functioning to remove the moisture from the molds so that they will be ready for the next casting operation. As the molds exit the mold drier 26 they enter the core setting station 28 ready to start another cycle.

It will be observed from the above description that conveyors are provided to handle the molds as the latter pass through various operating stations which function to condition the molds, mate, separate and clamp the molds, pour the slip, place and remove a funnel on the molds, separate the casting from the molds, and perform other functions as described or as will be described. A detailed description of the core setting machine 30 will now be set forth.

CORE SETTING MACHINE

As best shown in FIG. 2, the core setting machine 30 comprises an inverted U-frame 70 which straddles the core conveyor 10 and the tub conveyor 12. The frame 70 is comprised of two legs 72, 74 joined by the cross member 76, the legs 72, 74 being mounted on wheels 78 which ride on tracks 80. Thus the frame 78 is mounted for movement parallel to the path of travel of the conveyors 10 and 12.

The frame 70 mounts a core duster 82 and a plurality of operating mechanisms which function to align the core 14 and the tub mold 20, to remove the core 14 from the conveyor 10 and lower it into the cavity of the tub mold 20, to clamp the core to the tub mold 20, and to dust the next succeeding core mold 14 which is about to enter the station.

The operating mechanisms for lowering the core comprises carriers 84 mounted for vertical movement in the legs 72 and 74 of the frame 70. The carriers 84 comprise mounting blocks 86 (FIG. 5) one in each leg 72, 74 of the frame 70, and each mounted for vertical movement by means of rollers 90 rotatably supported on the mounting blocks 86. A plurality of rollers 90 may be provided for each mounting block 86 and alternate rollers may be horizontally spaced from one another. Accordingly, the tracks 92 carried on the frame legs 72, 74 by the bolts 94 may be spaced from one another a distance which is greater than the diameter of the rollers 90.

Extending from the mounting blocks 86 are lifters 96 which are adapted to engage a yoke 98 which is mounted on each core mold 14 and which has projecting ends 99 extending from opposite sides of the core mold 14. It will be observed that the lifters 96 may be raised vertically to engage the yoke ends 99 to thereby lift the core 14 off of the hook 25 and also to thereafter lower the core 14 from its elevated position where the core is inserted into and mated with an underlying tub mold 20. The lifters 96 and the yoke ends 99 may be V-shaped or of a similar configuration so that when the lifters 96 are raised to engage the yoke ends 99, if there is a slight difference in registry between the two, the V-shaped construction will cause the yoke ends 99 to be mated with the lifting members 96 since the weight of the core mold 14 will cause the V-shaped yoke ends 99 to seat in the V-shaped lifters 96. Accordingly, each core mold 14 will always be seated on the carrier 86 in the same position relative to the frame 70.

Figure 6:
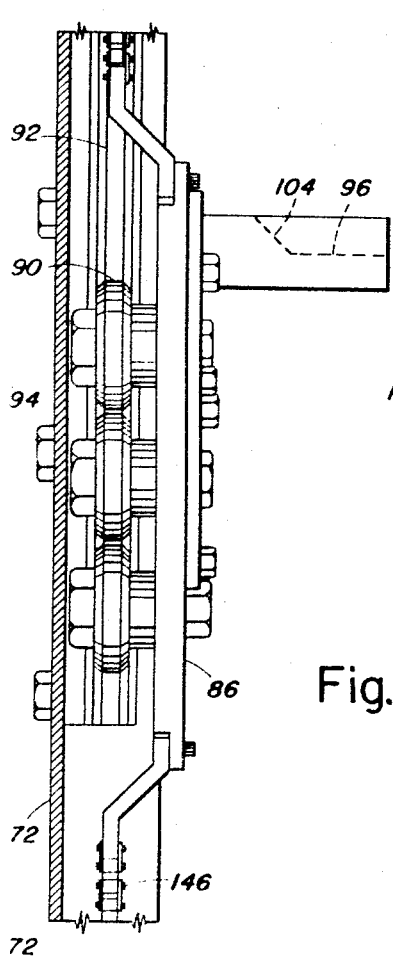
FIG. 6 is a side view of FIG. 5 looking along the line 6—6 thereof.
Figure 7:
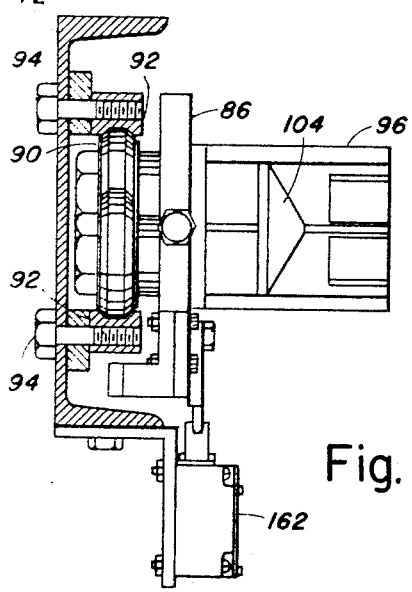
FIG. 7 is a plan view of FIG. 6.

It will also be observed that the yoke ends 99 are inclined such as shown at 102 (FIG. 2) and that the lifters 96 are also provided with inclined end surfaces 104 (FIGS. 6 and 7). Accordingly, if there is slight transverse misalignment when the lifters 96 are lifted to engage the yoke ends 99, the inclined surfaces 104 of the lifters 96 will engage the inclined surfaces 102 of the yoke ends 99 and the latter will slide into seated position due to its own weight. Wearing plates such as shown at 106 may be provided on the lifters 96.

Figure 3:
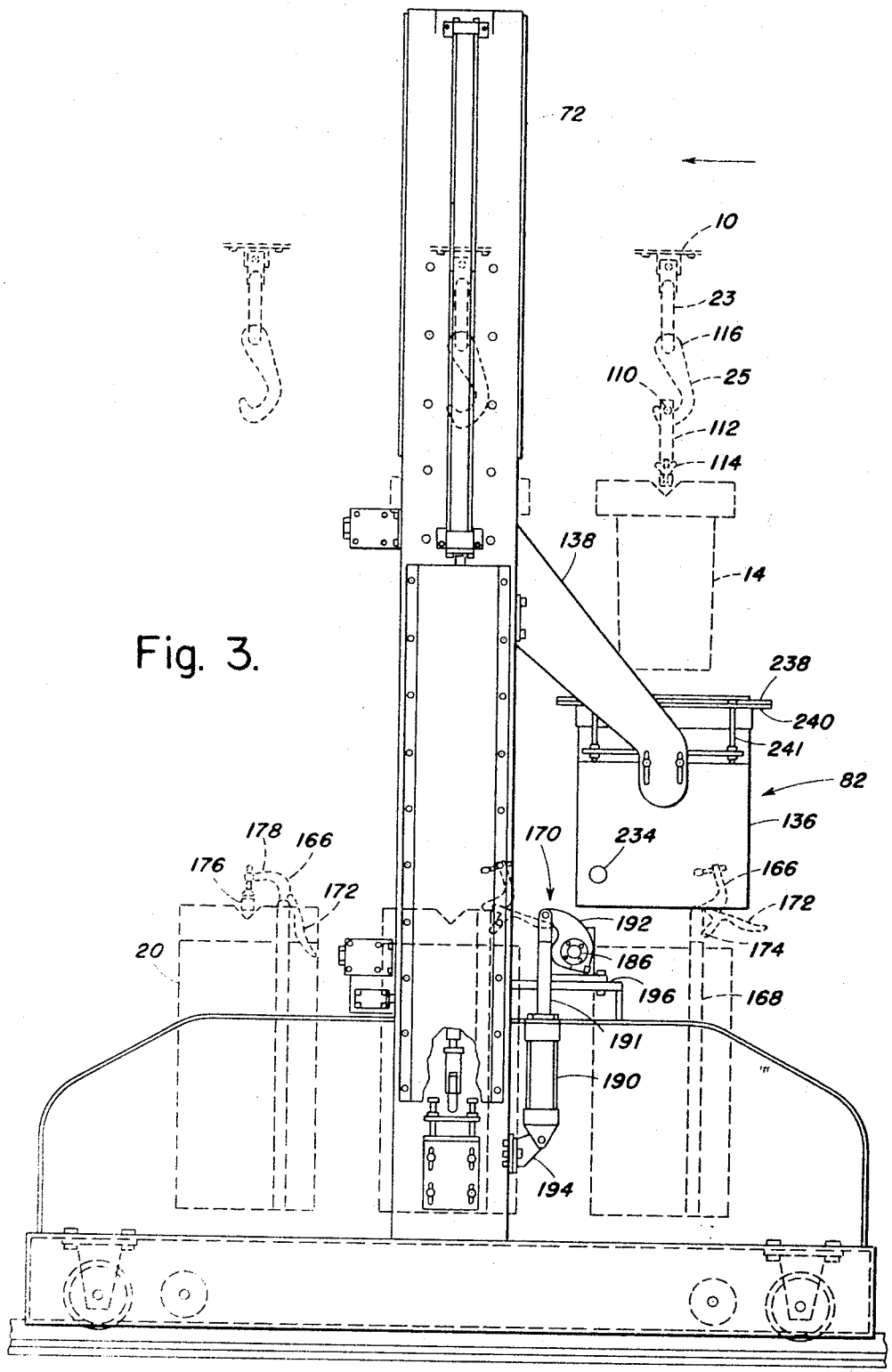
FIG. 3 is an outboard side elevation of FIG. 2.

Since the core molds 14 are supported from the conveyor 10 by the hooks 25, means are provided on the core setting machine 30 to deflect the hook 25 after the core 14 has been raised slightly by the lifters 96 such that upon subsequent lowering thereof, the core mold 14 will be lowered with the lifters 96 free of the hook 25. The hook 25 is adapted to engage a pin 110 which is carried by the strap members 112 extending from the core mold 14 and supported therefrom such as by the fastening members 114 (FIG. 3). The hook 25 is pivotally supported at 116 such that when the core mold 14 is slightly raised from the broken line position shown in FIG. 3 so that the core mold 14 may then be lowered FIG. 3, the hook 25 may be deflected to the right as viewed by the lifters 96.

Figure 10:
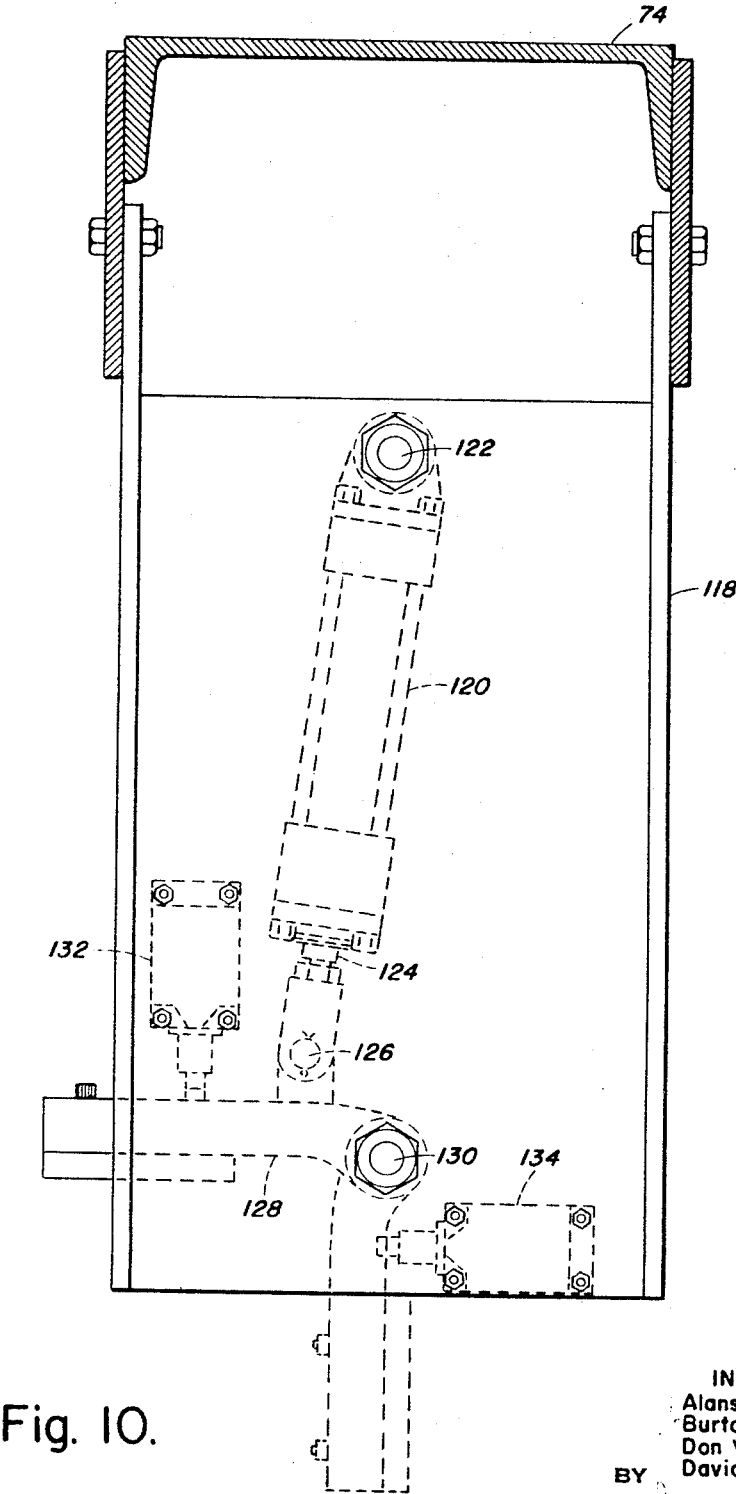
FIG. 10 is a plan view of the hook deflector on the core setting machine.
Figure 13:
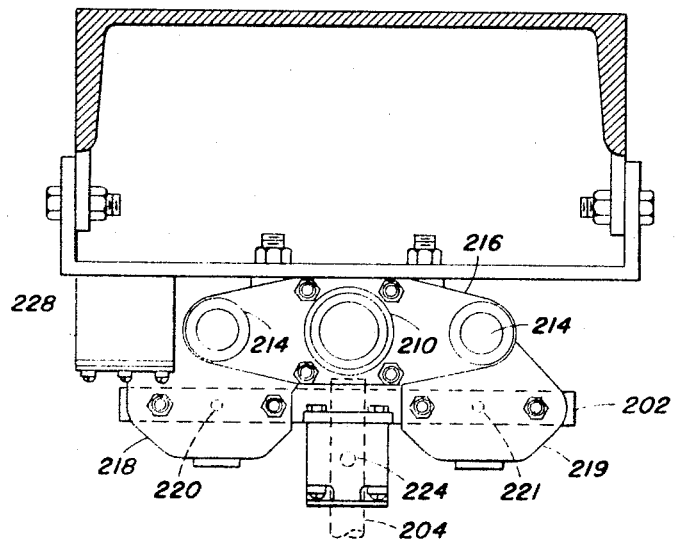
FIG. 13 is a plan view of FIG. 12.

The mechanism for deflecting the hook 25 comprises a bracket 118 extending from the frame leg 74 and supporting thereon a power cylinder 120 (FIGS. 2 and 10). The cylinder 120 is pivotally mounted on bracket 118 at 122 and has an operating piston 124 pivotally connected at 126 to a deflector arm 128, the latter in turn being pivotally supported from the bracket 118 at 130. From the above description it will be observed that when the piston 124 is extended, it will pivot the deflector arm 128 between the positions shown in FIG. 10. The vertical position of the deflector arm 128 in FIG. 10 is the position thereof as the hook is deflected. Limit switches 132 and 134 may be provided to control the operation of the power cylinder 120 as it operates the deflector arm 128.

Before describing the operating means for raising and lowering the lifters 96 it should be pointed out that core dusting apparatus is provided to operate in conjunction with the core setting machine 30. The core dusting apparatus functions to coat the core with dust or powder to facilitate release of the core from the cast article and also to control the casting rate, that is the rate at which the moisture is taken by the mold from the slip as the latter solidifies. The dusting apparatus comprises a dust box 136 supported for vertical movement on the frame 70 by the arms 138 and the carriers 140. It will be observed from FIG. 3 that the dust box 136 is mounted upstream of the direction of travel of the conveyor 10 at a distance spaced from the frame 70 equal to approximately the distance between each successive hook 25. Accordingly, when the dust box carrier 140 is raised, the dust box 136 will also be raised to enclose the core mold 14 which is the next core mold to enter the core setting station 32. It will be observed, therefore, that lowering and raising of the dust box carriers 140 function to raise and lower the dust box 136 to cover and uncover a preceding core mold 14. A detailed description of the dusting apparatus will be set forth hereinafter.

The dust box carriers 140 are similar to the core mold carriers 84 in that they utilize rollers 142 (FIG. 2) which are guided in the same tracks 92 in the frame legs 72, 74 in which the rollers 90 of the core mold carriers 84 are guided. The rollers 142 support mounting blocks 144 to which the arms 138 are attached.

It will be observed that there are two carriers 86 and 140 in each leg of the frame 70. These core carriers 84 are connected at either end thereof by a chain 146 formed into a closed loop which extends around the sprockets 148 and 150 rotatably supported on the frame leg 72. The core carrier 84 has attached thereto an arm 152 (FIG. 2) extending laterally thereof and to which is connected an operating piston 154 of a power operated cylinder 156 mounted in a vertical disposition along side the frame leg 72. Accordingly, as the piston 154 is extended and retracted it will raise and lower the carrier 84. Since there is another carrier 84 in frame leg 74 which is also raised and lowered, a shaft 158 extending between the two legs 72 and 74 is provided to drive a similiar chain and sprocket carrier arrangement in leg 74. From the above descrption it will be observed that operation of the power piston 154 will simultaneously raise and lower the two core carriers 84.

The dust box carriers 140 are not connected to the chain 146 and therefore are mounted for free vertical movement in the frame legs 72, 74. The dust box corriers 140 are lifted by the core carriers 84 by the provision of an engageable member 155 (FIG. 5) on the core carriers 86 which are adapted to engage the dust box carriers 140 to lift and lower the latter with the core carriers 84. The dust box 136 normally resides in the position shown in FIG. 2 wherein stop members 157 supported on the frame 70 such as by the bracket 161 support the dust box carriers 140 in the position shown. When the core mold carriers 84 are raised, the engageable member 155 will contact the dust box carrier 144 to lift the latter therewith until it covers the preceding core mold whereby dust is injected into the dust box 136 to dust the core as will be described. Upon subsequent lowering of the core mold carrier 84, the dust box carrier 140 will also be lowered to redeposit the latter on the stops 157 where it will be ready for the next operation while the core mold carrier 140 continues to descend to its lowered position.

It is preferable that the core 14 be lowered into the tub mold 14 at a relatively slow rate due to the close clearances and the critical nature of the alignment. However, the core 14 may be lowered from the conveyor 10 to a position just above the tub mold 20 at a relatively fast rate. Accordingly, cams such as that shown at 158 (FIG. 5) may be mounted on the carriers 84 to control the change of speed from fast to slow and vice versa. The cam 86 is provided with a raised surface 160 adapted to engage a limit switch 162 fixedly mounted on the frame 70 such as by the mounting plate 164. Thus the carrier 84 may be lowered quickly at a rapid rate until the core 14 is about ready to enter the tub mold 20 at which time the raised surface 160 will actuate the limit switch 162 which in turn actuates a mechanism such as a control valve to slow down the rate of extension of piston 154 in operating cylinder 156. It will be understood that similar cams and limit switches may be provided to control the speed of movement of the carrier as described and that other controls may be provided to limit the movement thereof. For example, limit switches may be provided to control the elevated and lowered termination points of the carrier and also to indicate the presence of a core or tub mold in the station before the carriers are operated.

As previously mentioned the core mold 14 after it is placed in tub mold 20 is clamped into a mated position.

To this end there are provided two clamps 166 on either side of the tub mold 20 and rigidly supported there by the support member 168. These clamps are designed and constructed so that they can be operated by manipulators 170 carried on the frame 70 and may be, for example, Detroit Stamping Company toggle clamp Model 435. The clamps 166 have an operating handle 172 and an over-center toggle arrangement such that once they are closed by pivotal movement of the operating handle 172, they will automatically lock themselves into such closed position. The closed position of the clamp 166 is shown to the left of FIG. 3 while the open position is shown to the right of FIG. 3. The clamp 166 may be moved between opened and closed positions by pivoting the operating handle 172 about the pivot 174. The clamps 166 carry a contact member 176 which is adjustable in the clamping arm 178. The contact member 176 is initially adjusted so that it will properly clamp a set of mated molds after which it generally will not require further adjustment. The subsequent opening and closing of the clamps 166 will provide the necessary and required force to properly maintain the molds in their mated position.

From the above description it will be seen that the operation of the clamps 166 are rather simple in that it only requires pivotal movement of the operating handle 172 through a relatively short pivotal arc. Accordingly, the clamps 166 are readily adaptable to be operated on by the manipulator 170 as will be described.

Figure 9:
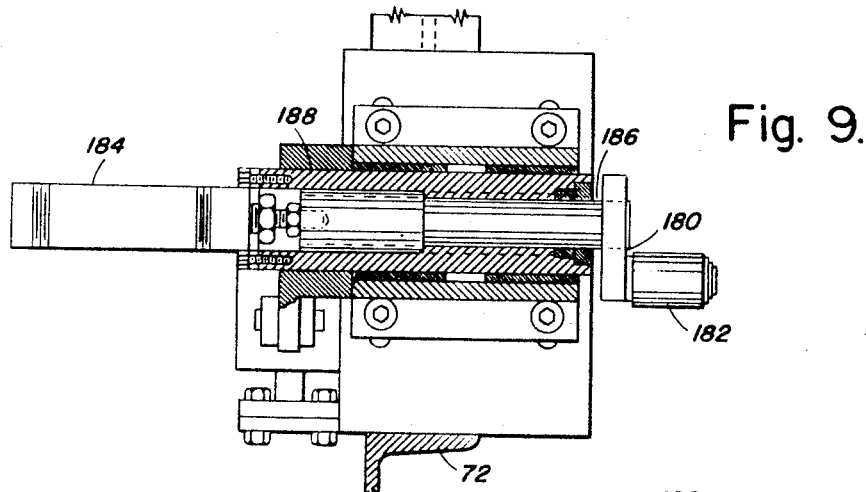
FIG. 9 is a plan view of FIG. 8 partially in section.
Figure 8:
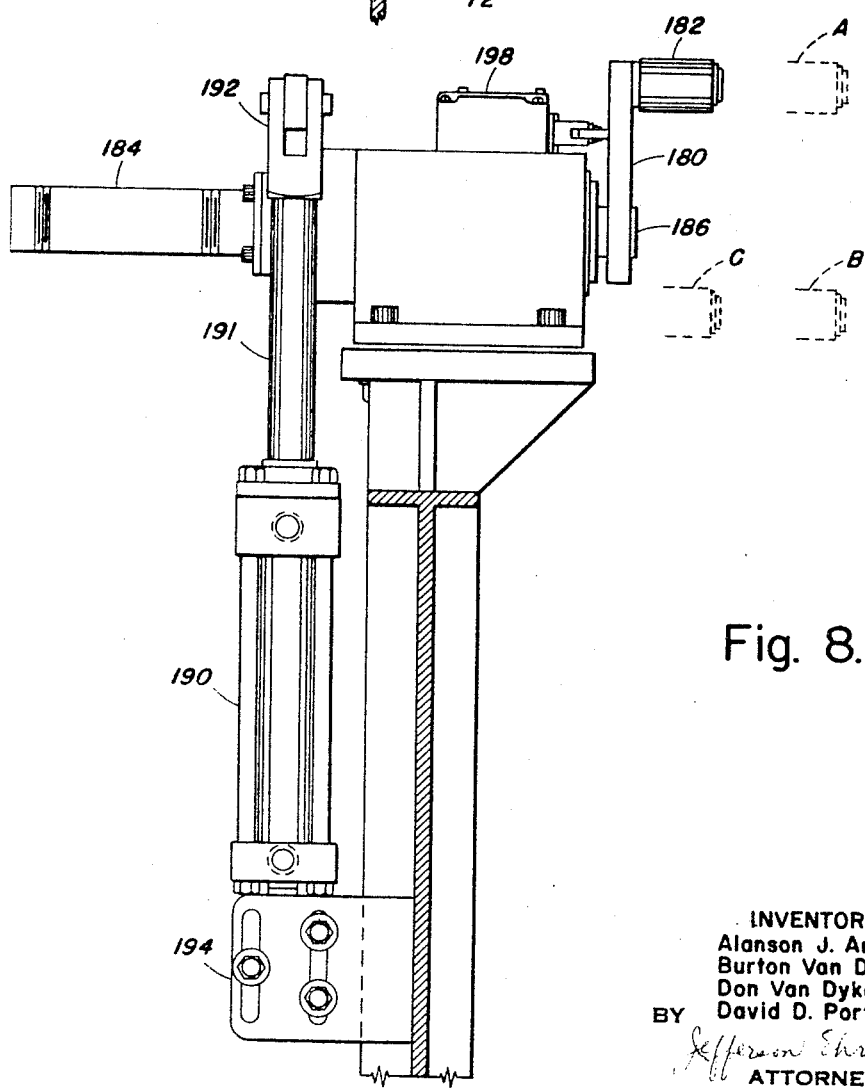
FIG. 8 is a partial elevational view taken along a plane transverse to the path of travel of the conveyors showing the clamp manipulator on the core setting machine.

The manipulators 170 for operating the clamps 166 comprise a crank 180 (see FIGS. 8 and 9) which can be rotated and extended longitudinally as indicated by the dotted line representations in FIG. 10. After the core mold 14 has been inserted in the tub mold 20, the crank 180 and its contact roller 182 is extended to positions A (FIG. 8) at which position it resides adjacent the operating handle 172 of the clamp 166. The crank 180 is then rotated so that the contact roller 182 will be pivoted to position B and in so pivoting closes the clamp 166. With the clamps 166 in closed position, the crank 180 is withdrawn so that it resides in position C (FIG. 8) whereupon reverse pivotal movement returns the crank to its initial solid line position shown in FIG. 10 ready to start another cycle.

The means for operating the manipulator crank 180 comprise a power cylinder 184 operable to extend and withdraw the shaft 186 on which the crank 180 is secured. A spline may be provided between the shaft 186 and a surrounding bushing 188 so that the shaft 186 may be moved longitudinally in the bushing 188 while rotation of the bushing 188 will cause rotation of the shaft 186. Accordingly, a power cylinder 190 having a piston rod 191 pivotally connected to the bell crank 192 which is in turn secured to the bushing 188 functions to rotate the shaft 186 and crank 180.

The power cylinder 190 is pivotally supported from each of the frame leg members 72 and 74 by a mounting bracket 94 (FIG. 3) while the housings for the bushings 188 are supported on platforms 196 (FIG. 3) extending from the frame legs 72 and 74. Limit switches such as at 198 may be provided to control the operation of the power cylinders 184 and 190.

Figure 4:
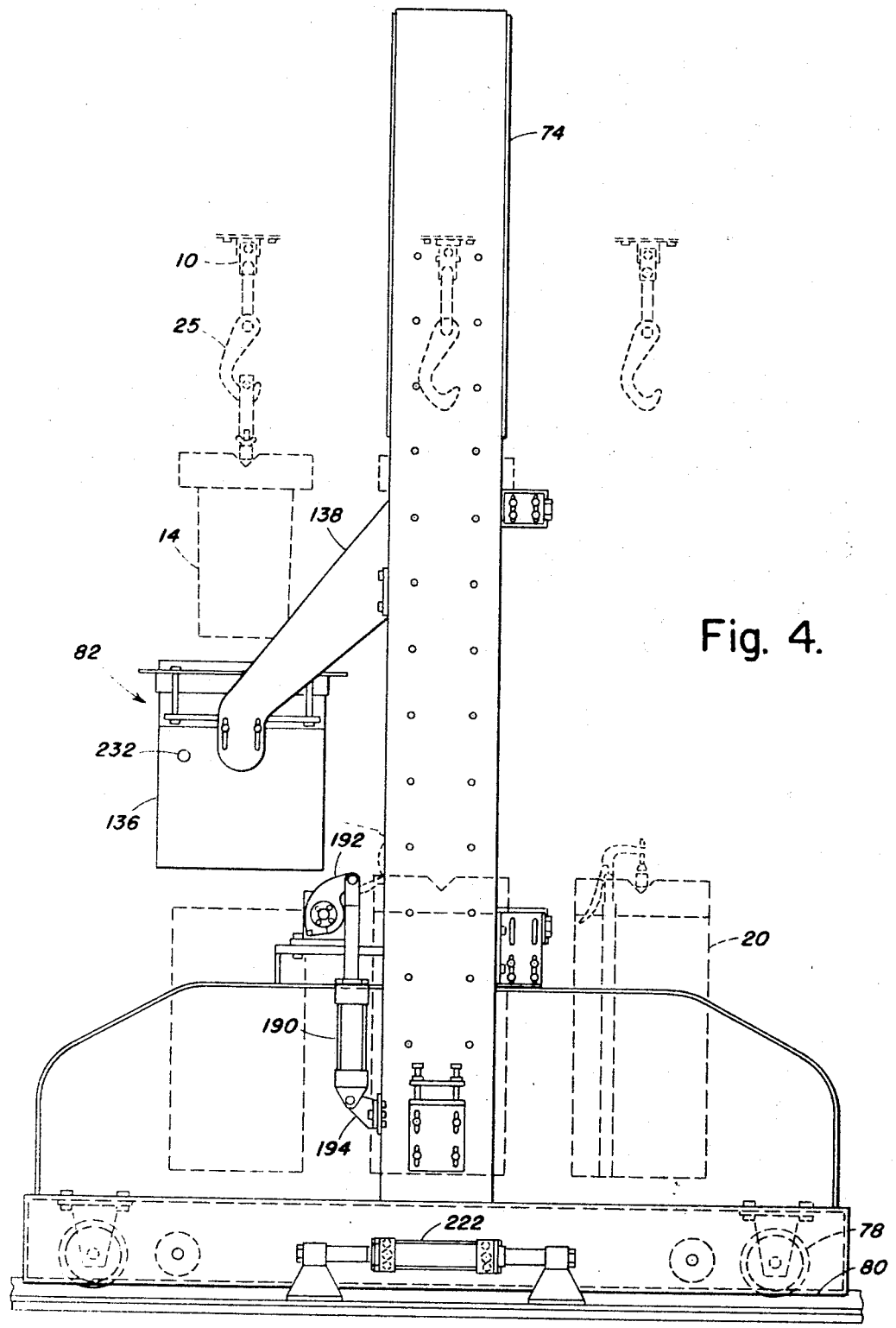
FIG. 4 is an inboard side elevation of FIG. 2.

Having described the apparatus for transferring the core mold 14 from the conveyor 10 to the tub mold 20 and the means for clamping the molds, a description of the control device 198 for insuring proper mating alignment of the frame 70 relative to the trucks 16 will now be set forth. The control device 198 may be a see-saw switch comprising a contact bar 202 (FIGS. 2 and 12) pivotally supported at a central longitudinal portion thereof. The contact bar 202 has an indentation such as the semi-circular cutout 203 which is adapted to accommodate a tow bar 204 extending from the side of the trucks 16 of the tub conveyor 12. The tow bar 204 may have a cylindrical cross section such that the upper portion thereof will fit into the semi-circular cutout 203. The central pivot support 206 for the contact bar 202 is mounted on a support structure 208 with the latter in turn being mounted for vertical movement. The means for imparting vertical movement comprises a power cylinder 210 operated by a control valve 212 (FIG. 14) and having an operating piston 212 secured to the support structure 208. Also secured to the support structure 208 are guide rods 214 which are guided in the fixed arms 216. Thus the power cylinder 210 is operable to raise and lower the support structure 208 which in turn pivotally mounts the contact bar 202. Mounted on the vertical movable support structure 208 are a pair of control devices such as spring loaded pneumatic pilot valves 218, 219 which have plungers 220, 221 respectively extending therefrom to engage the contact member 202. The plungers 220, 221 are operable to control the flow of air under pressure to a pilot operated hydraulic valve 213 which in turn controls flow of hydraulic fluid to an operating cylinder 222 (FIG. 4) which functions to move the frame 70 along the tracks 80. Cylinder speed flow control valves 223 may be provided in the hydraulic lines leading to the operating cylinder 222 as shown in FIG. 14.

Figure 5:
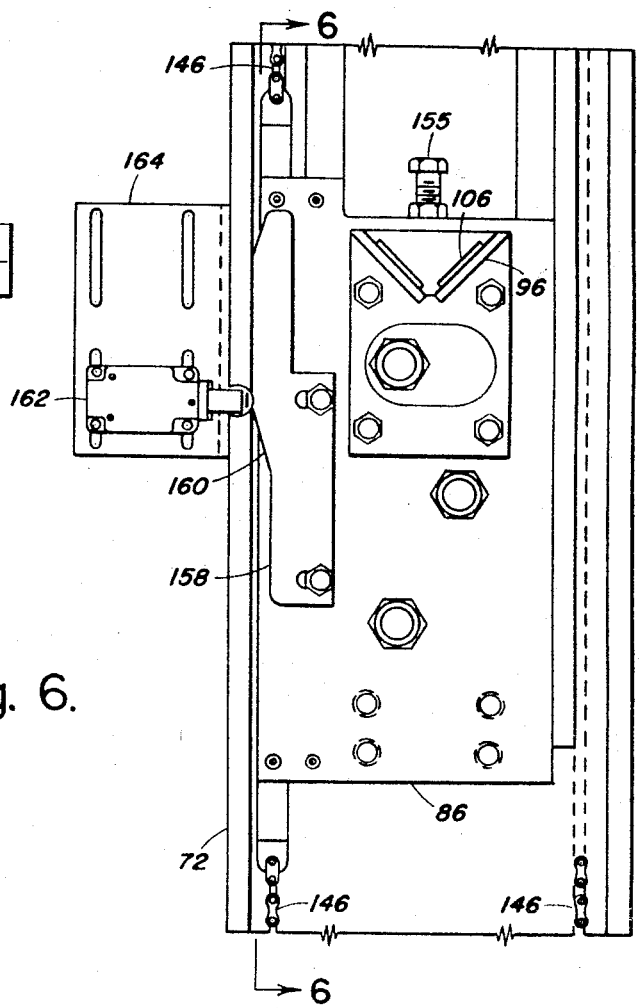
FIG. 5 is a partial elevational view taken along a plane parallel to the path of travel of the conveyors showing the carrier on the core setting machine for handling the core molds.

The operation of the see-saw switch is as follows. After a core mold 20 enters the core setting station 28, the control valve 212 is actuated to admit air to the power cylinder 210 to lower the support structure 208. If the frame 70 is in the proper position relative to the truck 16, the tow bar 204 will seat in the semicircular cutout 203 of the contact bar 202 and accordingly the operating plunger 224 of a limit switch 226 mounted on the support structure 208 will be pushed upwardly by the tow bar 204 thereby giving a signal that there is proper alignment of the frame 70 relative to the truck 16. If the frame 70 is not properly positioned relative to the truck 16 the lowering of the contact member 202 will cause the latter to contact the tow bar 204 at a position removed from the central position or semicircular cutout 203 so that the contact bar 202 will be pivoted about its central pivotal axis. Assuming that the frame 70 is too far to the right of the truck, as viewed in FIG. 12, then the contact bar 202 will contact the tow bar 204 somewhere to the left of the contact position shown in FIG. 5 thereby pivoting the contact bar 202 clockwise about its central axis to raise plunger 220 of pneumatic valve 218. The raising of the plunger 220 will cause the pneumatic pilot valve 218 to operate the hydraulic valve 213 which in turn admits hydraulic fluid to the cylinder 222 to move the frame 70. Thus the frame 70 will be moved to the left as viewed in FIG. 12 until the tow bar 204 comes into registry with the semicircular cutout 203 at which time, the contact bar 202 will pivot to its horizontal position as shown in FIG. 5 thereby allowing the plunger 220 of pneumatic valve 218 to return to its initial extended position to cut off fluid flow to the power cylinder 222 thereby stopping the movement of the frame 70. As the tow bar 204 slides into the semicircular cutout 203, the limit switch 226 is activated as previously described thereby providing a signal that there is proper registry between the truck 16 and the frame 70.

Figure 12:
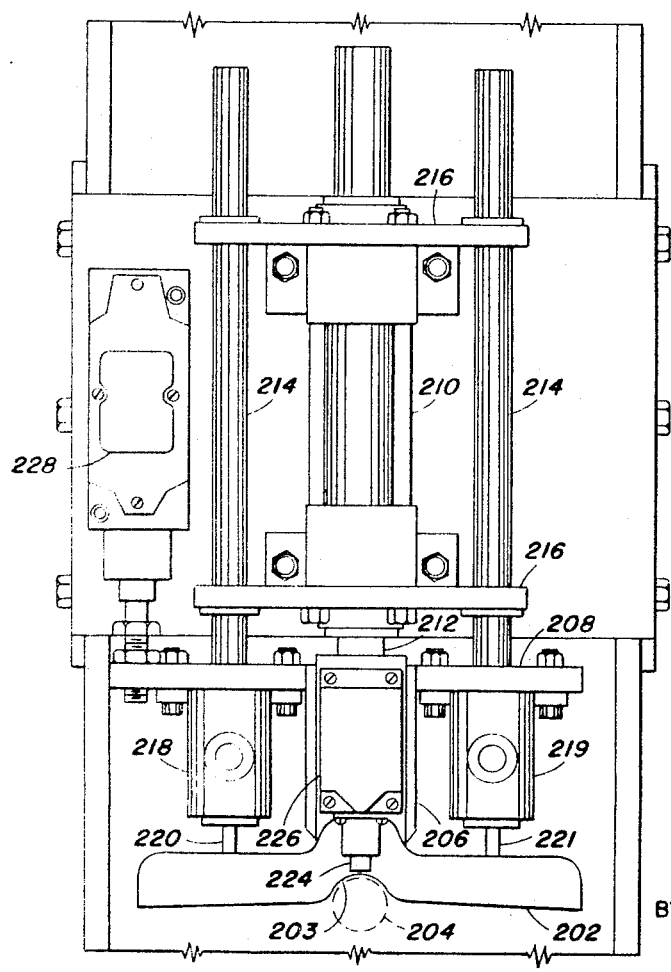
FIG. 12 is an elevational view of the control mechanism for aligning the core setting machine.

It will be understood that if the frame 70 is too far to the left of the truck 16 as viewed in FIG. 12 then the contact bar 202 will be pivoted counterclockwise as viewed in FIG. 12 to thereby actuate the pneumatic valve 219 to move the frame 70 to the right as viewed in FIG. 12 until proper registry is made as previously described.

Limit switches such as that shown at 228 may be provided to control the operating cylinder 210 as the latter moves the support structure 208 vertically.

CORE SETTING MACHINE OPERATION

The operation of the core setting machine 30 is as follows. The tub conveyor 12 is indexed to move a truck 16 into the core setting station 28. The advance of the tub conveyor 12 as it moves one step equivalent to the length of a truck may be controlled by a limit switch which is mounted in fixed position and which engages the truck to establish a signal to stop the tub conveyor drive means 24 after it drives the tub conveyor one indexing position. It will be understood that the limit switch for controlling and indexing the tub conveyor 12 may be located at any fixed position along the tub conveyor 12 to control the indexing of the tub conveyor. The core conveyor 10 may also be advanced and indexed by a limit switch in the same manner as the tub conveyor 12 is indexed and advanced.

After the core conveyor 10 and the tub conveyor 12 are indexed into the core setting station 28 as just described, the frame 70 which had been residing at an advanced position relative to the position at which the tub and core had stopped in the core setting station 28 is moved rearwardly (opposite to the direction of flow of the conveyors) by means of the operating cylinder 222 (FIG. 4) until it is stopped approximately in position adjacent the core and tub. In this operation the cylinder 222 may be actuated by a control device which produces a signal indicating the completion of indexing of the core conveyor 10 and tub conveyor 12 while the cylinder 222 may be deactivated by a signal produced by the limit switch 230 mounted on the frame 70 and having a contact arm 231 adapted to engage the tow bar 204.

The control device 198 is then actuated to lower the contact bar 202 so that the latter contacts the tow bar 204 to accurately position the frame 70 relative to the truck 16 as previously described. With the frame 70 accurately positioned relative to the tub 20, the core lifters 96 which are mounted on the frame 70 will be sure to accurately place the core 14 within the tub 20. Consequently, operation of the cylinder 156 will raise the carriers 86 so that the lifters 96 will engage the yoke ends 99 on the core mold 14 and lift the core mold 14 off of the hook 25 an amount sufficient so that the hook 25 may then be deflected as previously described. It will be understood that even if there is not exact initial registry between the lifters 96 and the yoke ends 99, that the lifters 96 will still be able to carry the yoke 98 in exactly the same position each time because the yoke 98 will seat itself in the V-shaped lifters 96 as previously described. Thus, even though the frame 70 may be moved slightly by the control device 198 to establish the accurate alignment between the frame 70 and truck 16 it will be understood that such latter movement will never be enough to prevent the lifters 96 from suitably engaging and seating the yoke 98.

After the lifters 96 have engaged the yoke 98 to lift the core 14 from the hook 25 and the hook has been deflected, the lifters 96 are lowered to deposit the core mold 14 within the tub 20. Limit switches and cams are provided to control the rate of raising and lowering of the lifters 96 as previously described. The lifters 96 continue to descend after the core mold 14 has been deposited in the tub mold 20 so that the lifters 96 will thereby be freed of the yoke 98. Limit switches may be provided to control the upper and lower terminus of the lifters 96.

With the core mold 14 suitably positioned in the tub mold 20, the clamp manipulators 170 are then actuated to close clamps 166 as previously described. The core conveyor 10 and tub conveyor 12 are then indexed and moved out of the core setting stations 28. The frame 70 is advanced in the direction of flow of the conveyors by the operating cylinder 222 so that it will be in proper position for the next entering truck.

As previously described, the raising of the core carriers 84 will raise the dust box 136 to enclose a preceding core mold 14 at which time dust may be introduced into the dust box 136 through an opening 232 by means of fan (not shown) and exhausted from the dust box 136 by an exhaust fan (not shown) through the opening 234. Means may be provided to inject compressed air such as through the opening 236 to agitate and spread the dust to insure proper coating of the core mold 14. Various means such as a rubber gasket 238 and a flange 240 mounted on springs 241 may be provided to seal the core mold 14 in the dust box 136 to prevent dust from escaping.

Core stabilizers 242 comprising elongated resilient members such as coil springs carrying a piece of rubber hose or the like may be provided to stabilize the core mold 14 and prevent it from swinging. A tendency to swing may be caused, for example, after the core conveyor 12 stops after completion of indexing whereby the momentum of the core mold 14 would tend to cause it to swing.

With the core and tub molds mated and clamped on the truck 16, the latter is indexed to the funnel placing station 32 where the funnel handling machine 34 is operable to grasp a funnel 35 from a funnel washing device 246 and deposit it in an opening in the core mold 14, such opening leading to the cavity between the core and tub molds. The funnel handling machine 34 comprises an arm 248 pivotal about the upright 250 between a position overlying the funnel washing device 246 and a position overlying the tub mold 20 while the latter is in station 32. The pivotal arm 248 grasps a clean funnel 35 from the funnel washing device 246, is lifted vertically on the upright 250, swung clockwise as viewed in FIG. 1A approximately 90 degrees, and then lowered on the upright 250 to thereby release and deposit the funnel 35 in the opening in the core mold 14.

A second arm 252 may also be provided to pivot on the upright 250 so that as the first arm 248 transfers a funnel from the funnel washing device 246 to station 32, the arm 252 will pick up a dirty funnel from station 34 and transfer it to the funnel washing device 246 where it is washed so that it can be subsequently transferred to station 32 by the pivotal arm 248 to be deposited on the next entering tub mold 20. It will be understtod that various operating cylinders and limit switches may be provided to control the operation of the funnel handling machine 35.

With the funnel 35 placed on the mated and clamped molds in station 32, the truck 16 carrying these molds enters the pouring station 36 where the pouring machine 38 may comprise an inverted U-shaped frame 254 straddling the tub conveyor 12 and mounting an extendable nozzle 256 operable to be raised and lowered into the funnel 35. As the nozzle 256 is lowered such as by a power cylinder 258 and is extended into the funnel 35, a valve 260 is actuated to admit slip to the funnel 35. A control device such as an electrode may be mounted adjacent the nozzle 256 to sense the filling of the nozzle to close the valve 260 whereupon the nozzle 256 is lifted and the tub mold 20 is free to pass on to the next station.

It will be noted that the pouring machine frame 254 is mounted for movement parallel to the path of travel of the tub conveyor 12 by means of the wheels 257 and tracks 259 so that the position at which the pouring of slip occurs may be varied relative to the position of the subsequent core lifting station 46. Thus with the movement of the tub conveyor 12 being indexed at a generally constant rate, it is possible by varying the position of the pouring machine 38 along the tracks 259 to regulate and control the time between pouring and subsequent lifting of the core to thereby control the state of solidification of the slip in the mold and the condition of the thusly formed tank relative to subsequent operations. For example, if it is determined that the slip will not be properly solidified when the mated molds enter the core lifting station 46, the pouring machine 38 may be advanced or moved rearwardly on the tracks 259 relative to the direction of flow of the tub conveyor 12 to reduce or increase the amount of time the truck 16 takes to traverse from the pouring station 36 to the core lifting station 46. Accordingly, with this arrangement it is not necessary to vary the rate of indexing or the rate of advancement of the tub conveyor 12 to control the casting rate as the latter may be controlled by varying the position of the slip pouring machine 48 relative to the subsequent core lifting machine 48.

After the truck 16 exits the pouring station 36, it then moves through the 180 degree turn 40 as the slip begins to solidify. The truck 16 then passes to station 34 where the funnel 35 is removed from the molds, as previously described, and then enters the core lifting station 46 where the core lifting machine 48 is operable to unclamp the clamps 166 and lift the core mold 14 from the tub mold 20.

Figure 15:
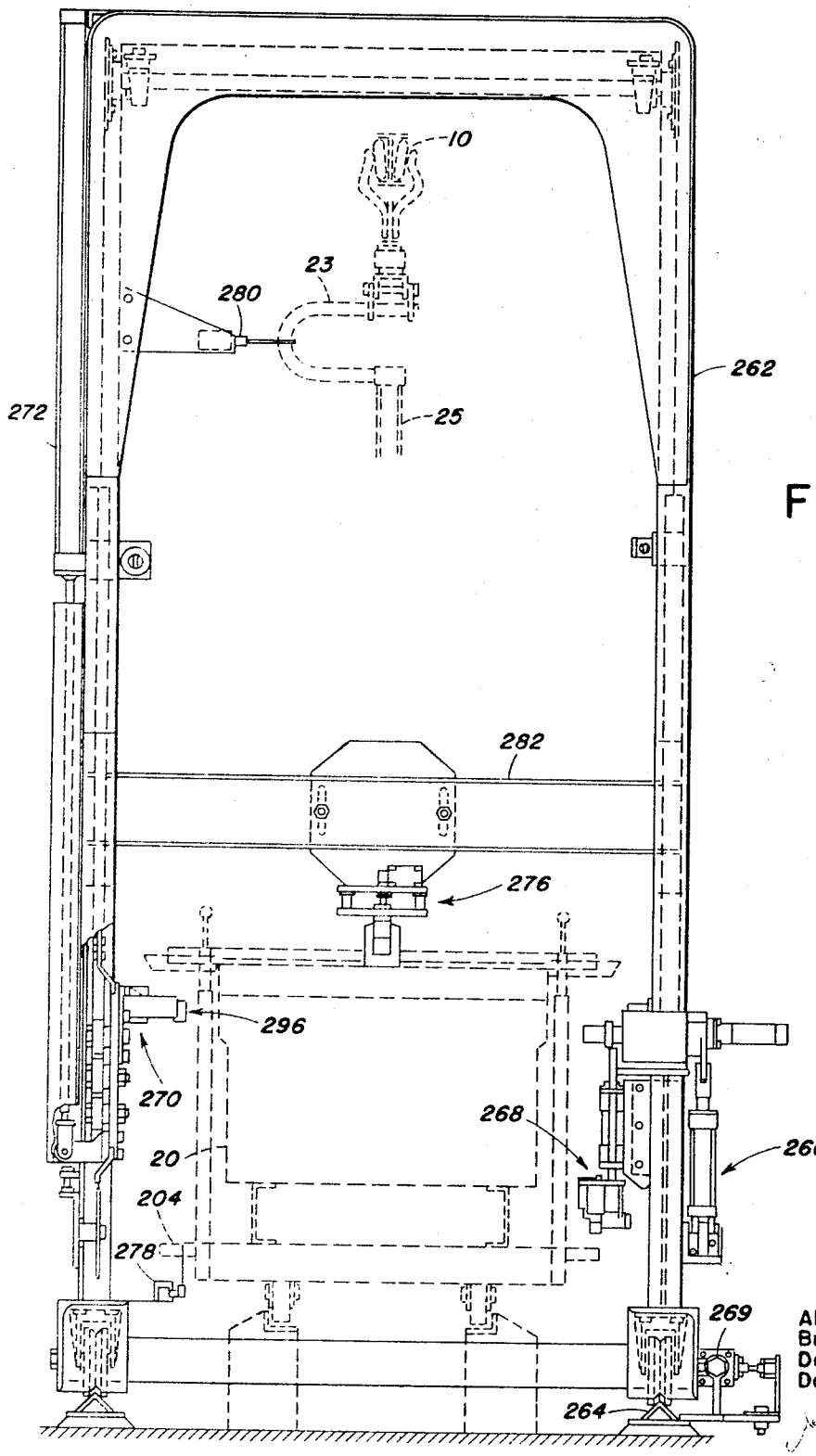
FIG. 15 is an elevational view of the core lifting machine.
Figure 16:
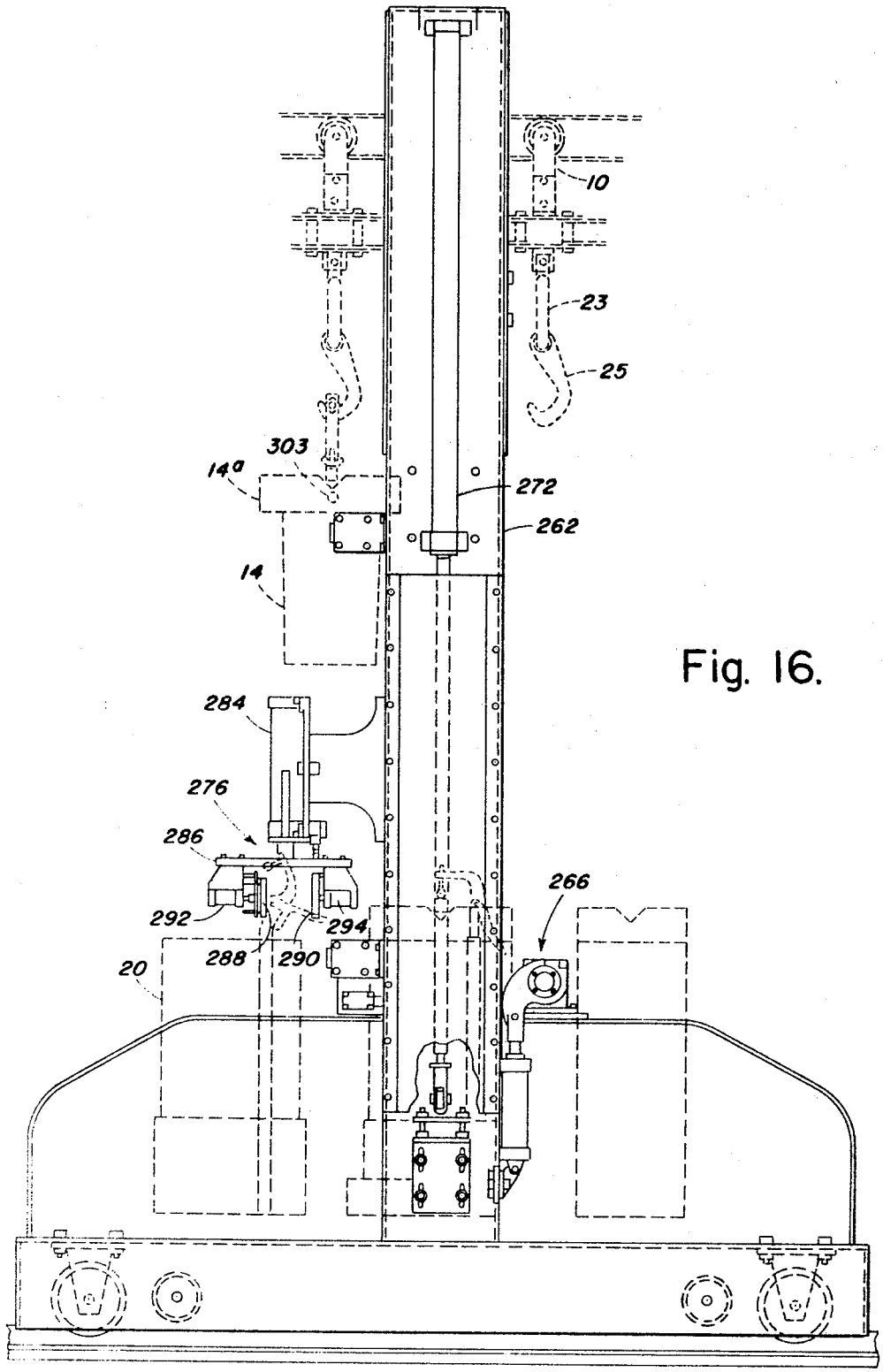
FIG. 16 is an outboard elevation of FIG. 15.

The core lifting machine 48 which is shown in FIGS. 15 and 16 has features similar to the core setting machine 30 and comprises an inverted U-shaped frame 262 straddling the core and tub conveyors and movably mounted on tracks 264. It also comprises manipulators 266 similar to the core setting machine manipulators 170 but operating in an opposite direction to unclamp the clamps 166, a control device 268 similar to the core setting machine control device 198 for positioning the frame 262 relative to the truck 16, carriers 270 similar to the core setting machine carriers 84 for lifting the core mold 14, and an operating cylinder 272 similar to core setting machine operating cylinder 156 to raise and lower the carriers.

The operation of the core lifter is as follows. As a truck 16 carrying mated molds containing the solidified tank enters the core lifting station 46, it overshoots the frame 262 in that the entering truck 16 resides downstream of the frame 262. The frame 262 is then advanced in the direction of travel of the trucks until the limit switch 278 contacts the tow bar 204 to produce a signal to deactivate an operating cylinder 269 (similar to the operating cylinder 222 on the core setting machine) to stop the advance of the frame 262. The control device 268 is then actuated to accurately position the frame 262 relative to the track 16 as previously described. The clamps 166 are unclamped by the manipulators 266 and then the power cylinder 272 raises the carriers 270 firstly at a relatively slow rate as the core mold 14 is withdrawn than at a relatively faster rate after withdrawal until the core mold 14 reaches its elevated position adjacent the hook 25. After the core mold 14 has reached its elevated position, the operating cylinder 269 moves the frame 268 rearwardly, that is in the direction opposite to the direction of movement of core conveyor 10, until the U-shaped member 23 contacts a limit switch 280 (FIG. 15) mounted on the frame 262 at which time the rearward movement of the frame 262 is stopped. Thus, with the limit switch 280 providing an indication that the hook 25 is in proper position, the carriers 270 are then lowered to deposit the core mold 14 on the hook 25 and return to their lowered position. With the core mold 14 redeposited on the hook 25 of the core conveyor 10, the core conveyor 10 and tub conveyor 12 are ready to move on as they are indexed by their respective drive means. The frame is then advanced in the direction of flow of the core and tub conveyor to a position where it is ready to repeat the same operation on the next advancing truck 16.

In order to facilitate withdrawal of the core mold 14 from the cast tank in the core lifting station 46, an air release mechanism 296 is provided to introduce air between the core mold 14 and the cast tank. It will be appreciated that as the withdrawal of the core mold is commenced, a reduced pressure may be produced within the tank which might tend to cause it to collapse or to be deformed, but that the introduction of air into this space will prevent this. The air release mechanism comprises a power cylinder 297 affixed to the carrier 270 and adapted to extend and retract a piston rod 302 so that a cup 300 carried on the end of the piston rod 302 may cover an opening 303 (FIG. 15) in the side of the core mold top flange 14a. Such opening 303 being the terminal end of an internal passageway in the core mold 14 extending to the bottom of the core mold 14 such that air introduced into such opening 303 will flow to the bottom of the core mold 14. The piston 302 has a longitudinal central opening 306 or air passageway for conducting air into the cup 300. The cup 300 may be made of a resilient material such as rubber. A spring loaded ball cheek valve 307 may be provided in the passageway 306 to provide one-way flow of air through the passageway 306. A flexible hose may be provided to conduct compressed air to the power cylinder 297. When air is admitted to the power cylinder, the piston rod 302 is first extended and then air in the cylinder passes through the central opening 306 to the cup 300.

A marking device 276 is mounted on a cross beam 282 of the frame 262 and comprises an operating cylinder 284 which is operable to lower and raise a marking block assembly 286. The marking block assembly 286 comprises a type block 288 and a backup block 290 both of which are movable by operating cylinders 292 and 294 respectively so that the type block 288 will engage the green but solidified tank casting to impress a date or other mark therein while the backup block 290 engages the tub mold 14 to serve as a backup support during the stamping. It will be understood that the operating cylinder 284 lowers and raises the marking block assembly 286 as each tub mold 20 exits the core lifting station 46. When the marking block assembly 286 is in its lowered position, the power cylinders 292 and 294 are actuated to apply the mark, then released, and the marking block assembly 286 then raised ready to commence the same operation on a subsequent cast tank.

After the trucks 16 are indexed out of the core lifting station 46, they are passed through the tank drier 50 whereupon exit therefrom they advance to the tank transfer machine 48 which lifts the cast tanks from the tub molds 14 and transfers them to the finishing conveyor 56 as previously described. The core conveyor 10 and tub conveyor 12 then carry the core and tub molds through the mold drier 50 which dries the molds whereupon exit therefrom they are ready to start another cycle.

From the above description it will seem that there has been provided a method and apparatus for casting a fixture which utilizes mechanized components to thereby eliminate the laborious and burdensome operation inherent in manual handling and manipulation of the various components. The operating mechanisms may be designed to operate, convey, mate, clamp and separate the molds in a continuous manner.

While various parts of the mechanisms have been described as being driven by operating cylinders, it is within the scope of the invention to use hydraulic or pneumatic cylinders or to use other types of electrical or fluid driven motors to actuate the moving parts. The electrical circuitry for the various limit switches and other sensing devices have not been illustrated since it is felt that these may be readily supplied by an artisan skilled in the art.

The invention hereinabove described may be varied in construction within the scope of the claim for the particular device selected to illustrate the invention is but one of many possible embodiments of the same. The invention, therefore, is not to be restricted to the precise details of the structure shown and described.

What is claimed is:

1. Apparatus for casting a tank, comprising a closed loop tub conveyor carrying tub molds, an elevated closed loop core conveyor carrying cores, a drive mechanism for advancing said conveyors along separate closed loop paths, core setting means adjacent said conveyors operable to remove a core from the core conveyor and mate it with an underlying tub mold carried by the tub conveyor, means for pouring slip into said mated molds, core lifting means adjacent said conveyors operable to lift said core from its mated position and return it to its core conveyor, said drive mechanism periodically advancing said conveyors to progressively move successive cores and tub molds to each said means, thereby to produce a tank with each such periodic advancement as each conveyor traverses its closed loop path.

2. Apparatus for making cast tanks comprising a closed loop tub conveyor carrying a plurality of spaced tub molds, a separate closed loop elevated core conveyor carrying a plurality of spaced cores, drive means for periodically advancing said conveyors, a core setting machine adjacent said conveyors operable to transfer a core from the elevated core conveyor to an underlying tub mold carried on the tub conveyor to thereby mate the cores and tub molds, said core setting machine further comprising clamping means operable to clamp said mated molds, a pouring machine downstream of said core setting machine operable to pour a casting material into the cavity between each core and mated tub mold, a core lifting machine downstream of said pouring machine operable to unclamp a mold and transfer the core from its mated position to an elevated position where it is returned to the overlying core conveyor, whereby an article is produced with each periodic advancement of the conveyors along their closed loop paths.

3. Apparatus for casting tanks according to claim 2, further comprising means for placing a funnel on each said mated core and tub mold before the pouring of said slip and for removing said funnel from the mated core and tub mold after the slip has been poured.

4. Apparatus for casting a fixture according to claim 2 further comprising a drier for drying the separated cores and tub molds and the cast fixture after the fixture has been removed from the molds.

5. Apparatus for casting tanks according to claim 2 further comprising means to facilitate the separation of the mated cores and tub molds as tanks are cast, said means comprising mechanism to introduce air between said tanks and said tub molds.

6. Apparatus for casting a fixture comprising a closed loop conveyor carrying a plurality of tub molds, a separate closed loop conveyor carrying a plurality of cores, core setting means operable to remove a core from said core conveyor and insert said core in a tub mold, means for pouring slip into the cavity between said core and tub mold, core lifting means operable to withdraw a core from said tub mold and return said core to its core conveyor, and a drive mechanism for periodically advancing said conveyors to move said cores and tub molds into and out of association with each said means, thereby to produce a fixture with each such periodic advancement as each conveyor moves successive cores and tub molds progressively through each of said means.

7. Apparatus for casting an article comprising a first closed loop conveyor carrying a plurality of cores, a second separate closed loop conveyor carrying a plurality of tub molds, a first station through which both said conveyors pass, said conveyors having means operable to dispose a core above a tub mold at said first station, means at said first station for transferring a core from its conveyor to the underlying tub mold to thereby mate said core and tub mold, a second station downstream of said first station having means for pouring slip into the cavity between said mated core and tub mold, a third station downstream of said second station having means for withdrawing said core from the tub mold and returning it to the first closed loop conveyor, a fourth station downstream of said third station having means for removing the cast article from said tub mold, and means for periodically advancing said closed loop conveyors progressively through said stations whereby an article is produced with each advancement as the conveyors traverse their closed loop paths.

8. Apparatus for casting a water closet tank, comprising a conveyor for conveying a plurality of tub molds along a closed loop path at one elevation, a second and separate conveyor for conveying a plurality of cores along a closed loop path at another higher elevation, drive means operable to periodically advance said conveyors to a mating station where a core overlies a tub mold, means for transferring an overlying core from the core conveyor to said underlying tub mold to mate the core and tub mold on the tub mold conveyor, said drive means being operable to advance said tub mold conveyor with the mated core and tub mold to a pouring station, means at said pouring station for pouring slip into the cavity between said mated core and tub mold, said drive means being operable to advance said tub mold conveyor with the mated core and tub mold from said pouring station to a core-lifting station, means at said latter station for lifting said core from its mated position and returning it to said core conveyor, said drive means being operable to advance said tub mold with its cast water closet tank from said lifting station to a tank transfer station, and means at said latter station for removing said cast water closet tank from said tub mold, said drive means being operable to periodically index and advance said conveyors progressively into and out of said stations whereby a water closet tank is produced with each periodic advancement as the conveyors repeatedly traverse their closed loop paths.

9. Apparatus for casting a fixture according to claim 1 in which the loops of the conveyors are of unequal lengths.

10. Apparatus according to claim 6 further comprising means for adjusting the spacial position of said slip pouring means and core lifting means relative to one another along said closed loop paths to thereby provide means to control the solidification of the slip in successive mated core and tub molds when the latter are conveyed at a generally overall constant rate of periodic advancement between said slip pouring means and core lifting means.

11. Apparatus according to claim 6 wherein said core and tub mold conveyors are disposed in separate generally horizontal planes.

12. Apparatus according to claim 6 further comprising a combination core and tub mold drier through which said closed loop conveyors pass.

13. Apparatus according to claim 6 further comprising a tank drier through which the tub mold and cast tank are conveyed by the tub mold conveyor, said core conveyor by-passing said tank drier.

References Cited

UNITED STATES PATENTS

| 1,557,371 | 10/1925 | Lea | 25—29 |
| 1,789,643 | 1/1931 | Ardelt | 164—340 |
| 1,813,721 | 7/1931 | Wright | 25—2 |
| 1,865,244 | 6/1932 | Frantz | 164—340 X |
| 2,583,842 | 1/1952 | Hendrickson | 25—29 |
| 2,978,854 | 4/1961 | Fairest | 53—166 |
| 3,189,971 | 6/1965 | Derror | 25—2 X |
| 3,240,356 | 3/1966 | Hill | 198—20 X |
| 3,305,907 | 2/1967 | Baker | 25—2 |

J. SPENCER OVERHOLSER, *Primary Examiner.*

R. D. BALDWIN, *Assistant Examiner.*

U.S. Cl. X.R.

25—29; 164—340; 198—20